US012665447B2

(12) United States Patent
Komuro et al.

(10) Patent No.: US 12,665,447 B2
(45) Date of Patent: Jun. 23, 2026

(54) LAMINATED IRON CORE AND ROTATING ELECTRIC MACHINE USING THE SAME

(71) Applicant: Hitachi, Ltd., Tokyo (JP)

(72) Inventors: Matahiro Komuro, Tokyo (JP);
Tomohiro Tabata, Tokyo (JP); Yusuke Asari, Tokyo (JP); Shohei Terada, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 235 days.

(21) Appl. No.: 18/718,678

(22) PCT Filed: Nov. 14, 2022

(86) PCT No.: PCT/JP2022/042178
§ 371 (c)(1),
(2) Date: Jun. 11, 2024

(87) PCT Pub. No.: WO2023/127328
PCT Pub. Date: Jul. 6, 2023

(65) Prior Publication Data
US 2025/0055329 A1      Feb. 13, 2025

(30) Foreign Application Priority Data
Dec. 28, 2021      (JP) ................................. 2021-214262

(51) Int. Cl.
H02K 1/02 (2006.01)

(52) U.S. Cl.
CPC ........... H02K 1/02 (2013.01); H02K 2213/03 (2013.01)

(58) Field of Classification Search
CPC ...... H02K 1/02; H02K 2213/03; H01F 27/24; H01F 27/245; H01F 3/02
See application file for complete search history.

(56) References Cited

U.S. PATENT DOCUMENTS

| | | | | |
|---|---|---|---|---|
| 2020/0003582 A1* | 1/2020 | Bengtsson | ................ | H01F 3/14 |
| 2022/0042157 A1* | 2/2022 | Komuro | .................... | C23C 8/80 |

FOREIGN PATENT DOCUMENTS

| | | |
|---|---|---|
| JP | 58-77009 U1 | 5/1983 |
| JP | 62-101349 U1 | 6/1987 |
| JP | 2000-83332 A | 3/2000 |
| JP | 2018-174650 A | 11/2018 |

(Continued)

OTHER PUBLICATIONS

International Search Report (PCT/ISA/210) issued in PCT Application No. PCT/JP2022/042178 dated Jan. 31, 2023 with English translation (5 pages).

(Continued)

*Primary Examiner* — Sean Gugger
(74) *Attorney, Agent, or Firm* — Crowell & Moring LLP

(57) ABSTRACT
There is provided a laminated iron core in which a plurality of types of soft magnetic iron plates are laminated. The plurality of types of the soft magnetic iron plates include a first soft magnetic iron plate and a second soft magnetic iron plate, the first soft magnetic iron plate and the second soft magnetic iron plate are alternately laminated, the first soft magnetic iron plate has higher nitrogen content and higher saturation magnetic flux density than the second soft magnetic iron plate, and the second soft magnetic iron plate has lower coercive force than the first soft magnetic iron plate.

20 Claims, 3 Drawing Sheets

(56)        References Cited

FOREIGN PATENT DOCUMENTS

JP          2020-132894  A      8/2020
JP          2021-16255  A       2/2021

OTHER PUBLICATIONS

Japanese-language Written Opinion (PCT/ISA/237) issued in PCT
Application No. PCT/JP2022/042178 dated Jan. 31, 2023 with
English translation (5 pages).

* cited by examiner

LAMINATED IRON CORE AND ROTATING ELECTRIC MACHINE USING THE SAME

TECHNICAL FIELD

The present invention relates to a technique of an iron core, and more particularly to a laminated iron core having saturation magnetic flux density higher than that of electromagnetic pure iron, and a rotating electric machine using the laminated iron core.

BACKGROUND ART

As an iron core of a rotating electric machine or a transformer, a laminated iron core obtained by laminate molding of a plurality of electromagnetic pure iron plates or electromagnetic steel plates (having thickness of, for example, 0.01 to 1 mm) is widely used. In an iron core, high conversion efficiency between electric energy and magnetic energy is important, and high magnetic flux density and low iron loss are important.

On the other hand, in a mechanical device using an iron core, cost reduction of the iron core is naturally one of important problems, and technology development for stably manufacturing the iron core at low cost while satisfying a required characteristic has been actively conducted conventionally.

For example, PTL 1 (JP 2018-174650 A) discloses an iron core for a motor formed by laminating a plurality of magnetic materials. Among a plurality of the magnetic materials, a first magnetic material has magnetic flux density $B_{50}$ of 1.7 T or more under excitation at 5000 A/m, and a second magnetic material has magnetic permeability at 1.0 T and 400 Hz higher than that of the first magnetic material by 50% or more and iron loss $W_{10/400}$ at 1.0 T and 400 Hz lower than that of the first magnetic material, and a volume fraction of the second magnetic material is 10% to 90%. Further, the second magnetic material is preferably an electromagnetic steel plate containing 6.0% to 7.0% of Si.

According to PTL 1, it is possible to effectively reduce loss at a radio frequency by using a material in which Si concentration of a surface layer is controlled to be high. Further, by using an electromagnetic steel plate having high Si concentration only in a surface layer, it is possible to reduce lowering in saturation magnetic flux density and to secure an operation characteristic under a high torque drive condition. In other words, by combining the first magnetic material, which is a high magnetic flux density material, and the second magnetic material, which is a high magnetic permeability and low iron loss material, an iron core that enables high torque drive at high efficiency can be obtained.

Further, PTL 2 (JP 2020-132894 A) discloses a soft magnetic material that is a plate-like or foil-like soft magnetic material having high saturation magnetic flux density, contains iron, carbon, and nitrogen, and contains γ-Fe and martensite containing carbon and nitrogen, and a nitrogen-containing phase is formed in the γ-Fe.

According to PTL 2, a soft magnetic material having saturation magnetic flux density exceeding that of pure iron and having thermal stability is manufactured at low cost, a characteristic of a magnetic circuit such as an electric motor is enhanced by use of the soft magnetic material, and miniaturization, high torque, and the like of an electric motor and the like can be realized.

CITATION LIST

Patent Literature

PTL 1: JP 2018-174650 A
PTL 2: JP 2020-132894 A

SUMMARY OF INVENTION

Technical Problem

In a rotating electric machine, it is important to increase saturation magnetic flux density Bs of an iron core for higher output and higher torque, and it is important to reduce a loss (iron loss Pi) of an iron core for higher efficiency. The iron loss Pi is the sum of a hysteresis loss and an eddy current loss, and coercive force Hc is desirably small in order to reduce a hysteresis loss, and higher electrical resistance and a thinner plate are effective in order to reduce an eddy current loss.

A magnetic characteristic of a commercially available electromagnetic pure iron plate is said to be Bs≈2.1 T. An iron core using an electromagnetic pure iron plate has an advantage of high Bs and low material cost, but has a disadvantage that Pi tends to be large because Hc is relatively high. The iron core of PTL 1 has an advantage that Pi is smaller than that of an iron core of an electromagnetic pure iron plate, but since Bs of an electromagnetic steel plate to be used is smaller than Bs of an electromagnetic pure iron plate, there is a disadvantage that Bs of the entire iron core does not exceed that of the iron core of the electromagnetic pure iron. Further, the soft magnetic material of PTL 2 has an advantage of having Bs higher than that of an electromagnetic pure iron plate, but is considered to have a disadvantage that Hc is higher than that of the electromagnetic pure iron plate.

As an iron-based material having Bs higher than that of an electromagnetic pure iron plate, an Fe—Co-based material and an Fe—N-based martensite material are known.

In the Fe—Co-based material, permendur (49Fe-49Co-2V mass %=50Fe-48Co-2V atom %) is a material that shows highest Bs among commercialized. However, soft magnetic materials currently material cost of Co fluctuates depending on the market, but is about 100 to 200 times higher than material cost of Fe, and permendur has a disadvantage that material cost is high. Further, permendur also has a slight disadvantage in workability, and has a disadvantage that processing cost tends to be high. If Co content is lowered, material cost can be reduced accordingly, and workability is also improved, but there is a disadvantage that Bs, which is a largest advantage, is also lowered.

On the other hand, an Fe—N-based martensite material (for example, $Fe_8N$ phase (α' phase) and an $Fe_{16}N_2$ phase (α" phase)) are attractive materials that have material cost overwhelmingly lower than that of permendur and exhibit high Bs comparable to permendur. However, there is a disadvantage that Hc and Pi are likely to increase due to increase in distortion of a crystal lattice due to N atom penetration and a distortion difference between crystal lattices due to a local concentration difference of N atoms.

In recent years, there is an extremely stronger demand for higher torque and higher output design in a rotating electric machine and a transformer, and improvement in Bs of an iron core has been strongly demanded. In other words, improvement in Bs of an iron core is prioritized, and if degree of improvement in Bs is large, a certain degree of increase in Pi tends to be allowed.

In view of the above, an object of the present invention is to provide a laminated iron core that allows reduction in excessive increase in Pi while exhibiting Bs higher than that of an electromagnetic pure iron plate and allows reduction in cost as compared with permendur, and a rotating electric machine using the laminated iron core.

Solution to Problem (I) One aspect of the present invention provides a laminated iron core in which a plurality of types of soft magnetic iron plates are laminated. The plurality of types of soft magnetic iron plates include a first soft magnetic iron plate and a second soft magnetic iron plate, the first soft magnetic iron plate and the second soft magnetic iron plate are alternately laminated, the first soft magnetic iron plate has higher nitrogen content and higher saturation magnetic flux density than the second soft magnetic iron plate, and the second soft magnetic iron plate has lower coercive force than the first soft magnetic iron plate.

Note that, in the present invention, the soft magnetic iron plate is defined to include a soft magnetic iron alloy plate in addition to a pure iron plate.

The present invention can add improvement and modification to the laminated iron core (I) according to the present invention described above.

(i) The first soft magnetic iron plate is an Fe—Co—N-based iron plate having a chemical composition containing 1 atom % or more and 25 atom % or less of cobalt (Co), 2 atom % or more and 10 atom % or less of nitrogen (N), and 0 atom % or more and 1 atom % or less of vanadium (V), with the balance containing iron (Fe) and an impurity.

(ii) A ratio of saturation magnetic flux density of the second soft magnetic iron plate to saturation magnetic flux density of the first soft magnetic iron plate is 0.8 or more and less than 1.

(iii) Saturation magnetic flux density of the second soft magnetic iron plate is 2.0 T or more.

(iv) Each of the first soft magnetic iron plate and the second soft magnetic iron plate has a thickness of 0.01 mm or more and 1 mm or less, and a thickness of the first soft magnetic iron plate is one time or more and five times or less a thickness of the second soft magnetic iron plate.

(v) The soft magnetic iron plate as the outermost layer has a magnetostriction constant equal to or less than a magnetostriction constant of another one of the soft magnetic iron plates.

(vi) The soft magnetic iron plate as the outermost layer is a third soft magnetic iron plate different from the first soft magnetic iron plate and the second soft magnetic iron plate.

(vii) An electrically insulating layer having electrical resistivity of $1 \times 10^6$ $\Omega \cdot cm$ or more is interposed between adjacent ones of the soft magnetic iron plates.

(II) According to another aspect of the present invention, there is provided a rotating electric machine including a laminated iron core, in which the laminated iron core is the laminated iron core according to the present invention.

Advantageous Effects of Invention

According to the present invention, it is possible to provide a laminated iron core that allows reduction in excessive increase in Pi while exhibiting Bs higher than that of an electromagnetic pure iron plate and allows reduction in cost as compared with permendur, and a rotating electric machine using the laminated iron core.

DESCRIPTION OF EMBODIMENTS

Hereinafter, an embodiment according to the present invention will be described more specifically with reference to the drawings. However, the present invention is not limited to the embodiment described herein, and can be appropriately combined with or improved on the basis of a publicly-known technique without departing from the technical idea of the invention.

[Laminated Iron Core of Present Invention]

Figure 1:
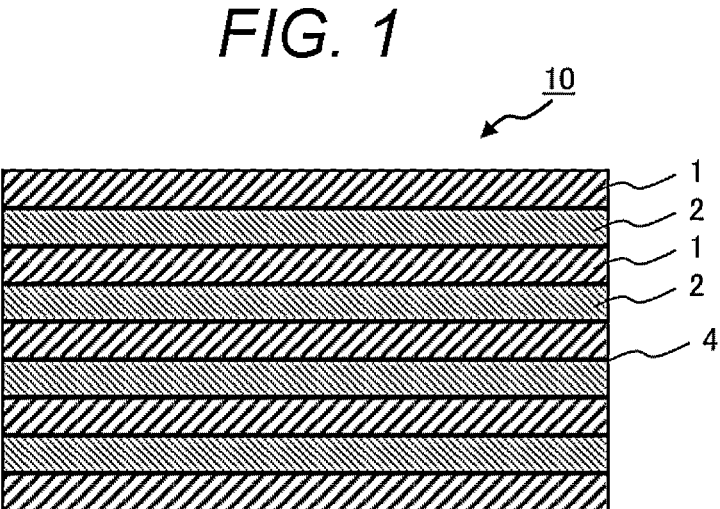
FIG. 1 is a schematic cross-sectional view illustrating an example of a laminated iron core according to the present invention.

FIG. 1 is a schematic cross-sectional view illustrating an example of a laminated iron core according to the present invention. As illustrated in FIG. 1, in a laminated iron core 10 according to the present invention, a first soft magnetic iron plate 1 and a second soft magnetic iron plate 2 are alternately laminated. Further, from the viewpoint of reduction in an eddy current loss, adjacent soft magnetic iron plates are preferably electrically insulated via an electrically insulating layer 4 (for example, an electrically insulating adhesive layer).

Since one of purposes of the laminated iron core 10 of the present invention is to exhibit Bs superior to that of an electromagnetic pure iron plate, at least one of the first soft magnetic iron plate 1 and the second soft magnetic iron plate 2 needs to have Bs higher than that of an electromagnetic pure iron plate. Note that, from a large number of experiments by the present inventors, it has been found that clear characteristic improvement and a significant difference are considered to be obtained when Bs is improved by 0.03 T or more as compared with that of a soft magnetic material as a comparison target. For this reason, at least one of the first soft magnetic iron plate 1 and the second soft magnetic iron plate 2 preferably has a magnetic characteristic of "Bs≥2.17 T".

Further, the laminated iron core 10 of the present invention also has an object of reducing cost as compared with permendur. In view of the above, at least one of the first soft magnetic iron plate 1 and the second soft magnetic iron plate 2 contains an N component in order to compensate for decrease in Bs while reducing material cost by reducing Co content to be lower than that of permendur.

However, since an N-containing iron plate tends to increase in Hc as described above, N content of at least one of the first soft magnetic iron plate 1 and the second soft magnetic iron plate 2 is kept low to reduce increase in Hc so that Pi of the entire laminated iron core 10 does not excessively increase (so that increase in Pi falls within an allowable range in designing a rotating electric machine).

When a plurality of types of soft magnetic iron plates are laminated, magnetostatic coupling occurs as a magnetic action between adjacent soft magnetic iron plates. Since this magnetostatic coupling acts between soft magnetic iron plates so as to minimize magnetic energy, when a magnetization direction of one soft magnetic iron plate changes, a magnetization direction of another soft magnetic iron plate also changes so as to follow. By reducing Hc of at least one of the first soft magnetic iron plate 1 and the second soft magnetic iron plate 2 to be low, Hc of the laminated iron core 10 as a whole can be reduced.

More specifically, the first soft magnetic iron plate 1 preferably uses an Fe—Co—N-based iron plate having a chemical composition containing Co of 1 atom % or more and 25 atom % or less, N of 2 atom % or more and 10 atom % or less, and V of 0 atom % or more and 1 atom % or less, with the balance containing Fe and an impurity. From the viewpoint of the balance between Bs and material cost, Co content is more preferably 3 atom % or more and 23 atom % or less, still more preferably 5 atom % or more and 20 atom % or less. From the viewpoint of the balance between Bs and Hc, N content is more preferably 3 atom % or more and 8 atom % or less, still more preferably 4 atom % or more and 7 atom % or less. V is a component that contributes to improvement in workability of an iron plate, but is not an essential component (may or may not be contained).

From the viewpoint of Hc, the second soft magnetic iron plate 2 preferably has lower N content than the first soft magnetic iron plate 1. Further, from the viewpoint of Bs of the entire laminated iron core 10, Bs of the second soft magnetic iron plate 2 is preferably 0.8 or more and less than 1, more preferably 2.0 T or more, still more preferably 2.1 T or more of Bs of the first soft magnetic iron plate 1. More specifically, the second soft magnetic iron plate 2 is preferably an electromagnetic pure iron plate or an iron plate having Co content higher than that of the first soft magnetic iron plate 1 and containing no N component.

A thickness of the first soft magnetic iron plate 1 and the second soft magnetic iron plate 2 is not particularly limited, and can be appropriately selected within a range of 0.01 mm or more and 1 mm or less. From the viewpoint of controllability of N content, a thickness of the first soft magnetic iron plate 1 is preferably 0.03 mm or more and 0.5 mm or less, and more preferably 0.05 mm or more and 0.3 mm or less. Further, from the viewpoint of Bs and Hc of the entire laminated iron core 10, as to a ratio of thicknesses between the first soft magnetic iron plate 1 and the second soft magnetic iron plate 2, a thickness of the first soft magnetic iron plate 1 is preferably one time or more and five times or less, more preferably one time or more and four times or less a thickness of the second soft magnetic iron plate 2.

The electrically insulating layer 4 preferably has electrical resistivity of $1 \times 10^6$ $\Omega \cdot cm$ or more from the viewpoint of securing electrical insulation. A thickness of the electrically insulating layer 4 is not particularly limited, but a thickness of the electrically insulating layer 4 is preferably 1 μm or more and 10 μm or less, and more preferably 2 μm or more and 5 μm or less so that a space factor of a soft magnetic iron plate of a laminated iron core is 90 vol % or more. Further, a space factor of a soft magnetic iron plate of a laminated iron core is more preferably 95 vol % or more, still more preferably 97 vol % or more.

Figure 2:
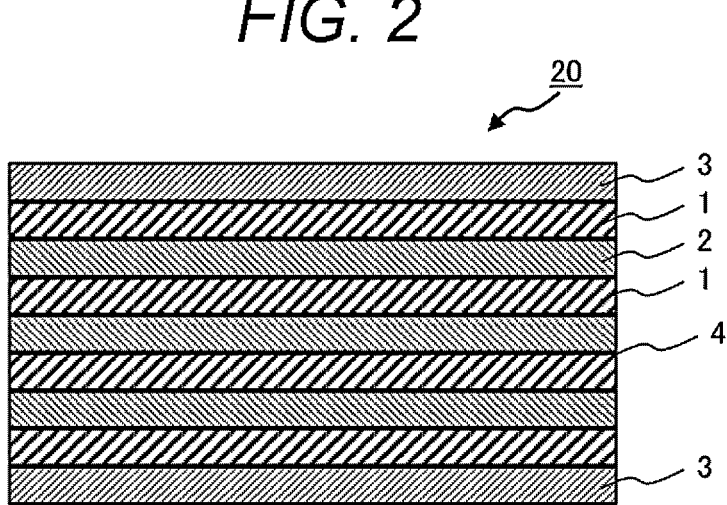
FIG. 2 is a schematic cross-sectional view illustrating another example of the laminated iron core according to the present invention.

FIG. 2 is a schematic cross-sectional view illustrating another example of the laminated iron core according to the present invention. As illustrated in FIG. 2, in a laminated iron core 20, a third soft magnetic iron plate 3 is arranged on an outermost layer of the first soft magnetic iron plate 1 and the second soft magnetic iron plate 2 alternately laminated. As the third soft magnetic iron plate 3, a soft magnetic iron plate having a smallest magnetostriction constant among soft magnetic iron plates to be laminated is preferably used.

More specifically, in a case where only two types of soft magnetic iron plates (the first soft magnetic iron plate 1 and the second soft magnetic iron plate 2) are laminated, one of the first soft magnetic iron plate 1 and the second soft magnetic iron plate 2 having a smaller magnetostriction constant is arranged as an outermost layer. In other words, one having a smaller magnetostriction constant also serves as the third soft magnetic iron plate 3. Further, in a case where three or more types of soft magnetic iron plates are laminated, a soft magnetic iron plate having a smallest magnetostriction constant is arranged as the third soft magnetic iron plate 3 in an outermost layer. However, from the viewpoint of Bs of the entire laminated iron core 20, Bs of the third soft magnetic iron plate 3 is also preferably 0.8 or more and less than 1, more preferably 2.0 T or more, still more preferably 2.1 T or more of Bs of the first soft magnetic iron plate 1.

As a soft magnetic iron plate having a smallest magnetostriction constant is arranged in an outermost layer of a laminated iron core, increase in Pi of a laminated iron core can be minimized in an environment where external stress is applied to a laminated iron core (for example, a process of assembling a laminated iron core, a process of incorporating a laminated iron core into a rotating electric machine member, and the like).

[Rotating Electric Machine Using Laminated Iron Core of Present Invention]

Figure 3A:
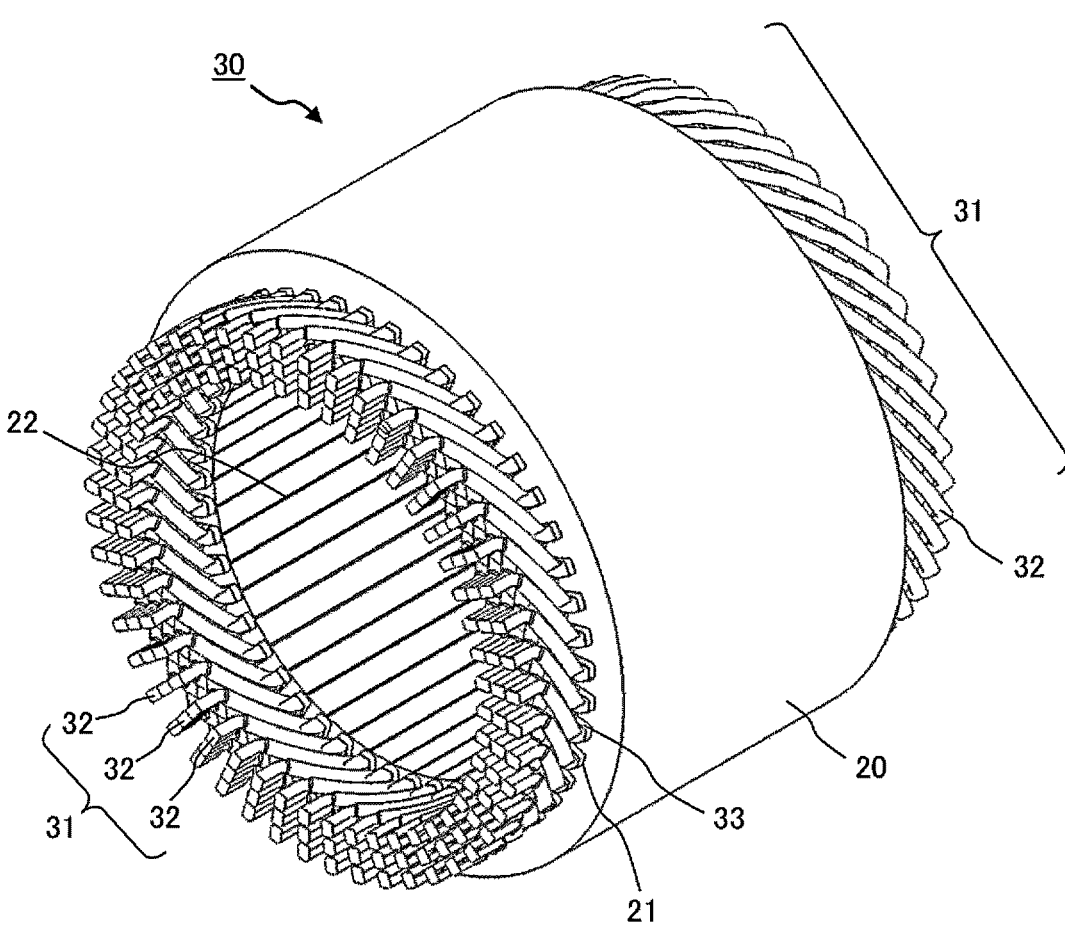
FIG. 3A is a schematic perspective view illustrating an example of a stator of a rotating electric machine.
Figure 3B:
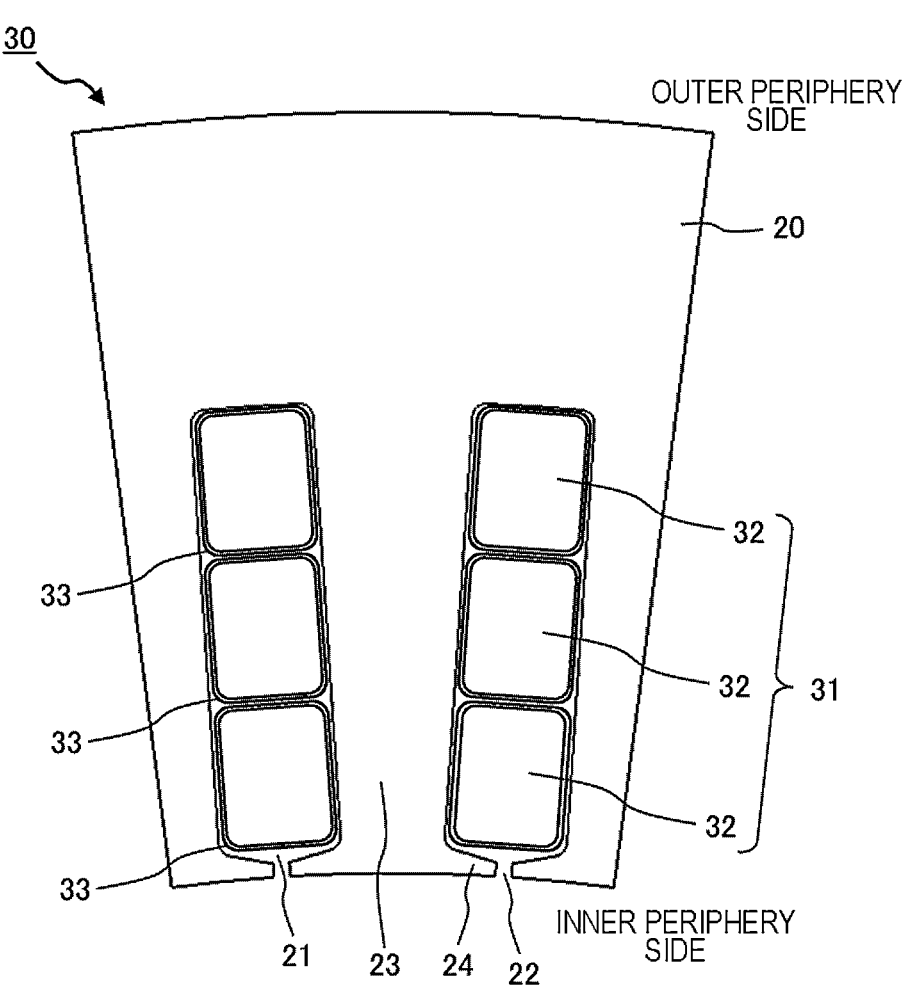
FIG. 3B is an enlarged transverse cross-sectional schematic view of a slot region of the stator.

FIG. 3A is a schematic perspective view illustrating an example of a stator of a rotating electric machine, and FIG. 3B is a schematic enlarged transverse cross-sectional view of a slot region of the stator. Note that a transverse cross-section means a cross section orthogonal to a rotation axis direction (a cross section whose normal line is parallel to the axial direction). In the rotating electric machine, a rotor (not illustrated) is arranged on the inner side in a radial direction of the stator in FIGS. 3A to 3B.

As illustrated in FIGS. 3A to 3B, a stator 30 is formed as a stator coil 31 is wound around a plurality of stator slots 21 formed on the inner peripheral side of the laminated iron core 20. The stator slots 21 are spaces formed to be arrayed at a predetermined circumferential pitch in a circumferential direction of the laminated iron core 20 and formed to penetrate in the axial direction, and a slit 22 extending in the axial direction is opened and formed in an innermost peripheral portion. A partitioning region of adjacent ones of the stator slots 21 is referred to as a tooth 23 of the laminated iron core 20, and a portion defining the slit 22 in a tip region on the inner peripheral side of the tooth 23 is referred to as a tooth claw portion 24.

The stator coil 31 is usually constituted by a plurality of segment conductors 32. For example, in FIGS. 3A to 3B, the stator coil 31 includes three of the segment conductors 32 corresponding to a U phase, a V phase, and a W phase of three-phase alternating current. Further, from the viewpoint of preventing partial discharge between the segment conductor 32 and the laminated iron core 20 and partial discharge between each phase (U-phase, V-phase, and W-phase), an outer periphery of each of the segment conductors 32 is usually covered with an electrically insulating material 33 (for example, insulating paper and enamel coating).

The rotating electric machine according to the present invention is a rotating electric machine using the laminated iron core 21 of the present invention. As described above, the laminated iron core 21 of the present invention has Bs higher than that of a conventional laminated iron core made from an electromagnetic pure iron plate or an electromagnetic steel plate, and this leads to higher torque and miniaturization of the rotating electric machine. Further, since the laminated iron core 21 of the present invention can be made at lower cost than a laminated iron core including a permendur plate, it is possible to reduce excessive increase in cost of the rotating electric machine.

EXAMPLE

Hereinafter, the present invention will be described more specifically by various experiments. However, the present invention is not limited to a configuration and a structure described in these experiments.

Experiment 1

(Preparation of Soft Magnetic Iron Plate)

Commercially available pure metal raw materials (purity=99.9% for Fe and Co) were mixed, and an alloy ingot was prepared by an arc melting method (automatic arc melting furnace, manufactured by DIAVAC LIMITED, under reduced pressure Ar atmosphere) on a water-cooled copper hearth. At this time, for alloy ingot homogenization, re-melting was repeated six times while the sample was reversed. Pressing processing and rolling processing were performed on the obtained alloy ingot to prepare an Fe-5-atom %-Co plate (thickness=0.1 mm, hereinafter referred to as Fe-5Co plate), an Fe-10-atom %-Co plate (thickness=0.1 mm, hereinafter referred to as Fe-10Co plate), an Fe-20-atom %-Co plate (thickness=0.1 mm, hereinafter referred to as Fe-20Co plate), and an Fe-50-atom %-Co plate (thickness=0.1 mm, 0.05 mm, and 0.025 mm, hereinafter referred to as Fe-50Co plate).

Further, a commercially available electromagnetic pure iron plate (thickness=0.1 mm, hereinafter referred to as Fe plate), an electromagnetic steel plate (thickness=0.1 mm, hereinafter referred to as Fe-3Si plate), an amorphous iron plate 1 (thickness=0.025 mm, hereinafter referred to as Fe-12Si-10B plate), and an amorphous iron plate 2 (thickness=0.02 mm, hereinafter referred to as Fe-1Cu-3Nb-13Si-9B plate) were separately prepared.

Nitrogen immersion heat treatment for introducing an N component was performed on the Fe plate, the Fe-5Co plate, the Fe-10Co plate, and the Fe-20Co plate prepared above. In the nitrogen immersion heat treatment, $NH_3$ gas ($1\times10^5$ Pa) was introduced when the temperature reached 500° C., the temperature was raised to 800° C. that is a stable temperature of an austenite phase ($\gamma$ phase), then $NH_3$ gas and $N_2$ gas ($1\times10^5$ Pa) were alternately switched while the temperature was maintained, and introduction and diffusion of the N component was controlled so that N concentration was 5 atom %. After the above, oil quenching (60° C.) was performed for undergoing martensitic transformation, and then super-sub-zero treatment with liquid nitrogen was performed for martensitic transformation of a residual $\gamma$ phase. By the above, an Fe-5-atom %-N plate (hereinafter referred to as Fe-5N plate), an Fe-5-atom %-Co-5-atom %-N plate (hereinafter referred to as Fe-5Co-5N plate), an Fe-10-atom %-Co-5-atom %-N plate (hereinafter referred to as Fe-10Co-5N plate), and an Fe-20-atom %-Co-5-atom %-N plate (hereinafter referred to as Fe-20Co-5N plate) were prepared.

Experiment 2

(Investigation of Magnetic Characteristic of Soft Magnetic Iron Plate)

Magnetic characteristics (Bs, Hc, Pi, magnetostriction constant) of various soft magnetic iron plates prepared in Experiment 1 were investigated. Size of a measurement sample was 20 mm in width×60 mm in length.

Magnetization (unit: emu) of a sample was measured under conditions of a magnetic field of 1.6 MA/m and temperature of 20° C. using a vibrating sample magnetometer (BHV-525H manufactured by Riken Denshi Co., Ltd.), and Bs (unit: T) and the coercive force Hc (unit: A/m) were obtained from sample volume and sample mass. Pi_1.0/400 (unit: W/kg) of a sample was measured under conditions of magnetic flux density of 1.0 T, 400 Hz, and temperature of 20° C. by an H coil method (in accordance with JIS C 2556:2015) using a BH loop analyzer (IF-BH550 manufactured by IFG Corporation) and a vertical yoke single plate tester. Further, displacement of the measurement sample when an AC magnetic field of 10 kA/m was applied in a longitudinal direction of the measurement sample was measured by an optical heterodyne type laser displacement meter (TLVM type manufactured by TOEI INDUSTRY CO., LTD.), and a magnetostriction constant was obtained from a relationship between an applied magnetic field and the displacement. An investigation result is shown in Table 1.

TABLE 1

| Investigation result of magnetic characteristic of soft magnetic iron plate | | | | |
|---|---|---|---|---|
| Soft magnetic iron plate | Bs (T) | Hc (A/m) | Pi_{-1.0/400} (W/kg) | Magnetostriction constant |
| Fe—5N plate | 2.25 | 100 | 33 | $2 \times 10^{-6}$ |
| Fe—5Co—5N plate | 2.31 | 120 | 29 | $7 \times 10^{-6}$ |
| Fe—10Co—5N plate | 2.35 | 160 | 36 | $12 \times 10^{-6}$ |
| Fe—20Co—5N plate | 2.42 | 200 | 48 | $20 \times 10^{-6}$ |
| Fe—50Co plate | 2.28 | 52 | 9 | $70 \times 10^{-6}$ |
| Fe—20Co plate | 2.22 | 60 | 30 | $25 \times 10^{-6}$ |
| Fe plate | 2.14 | 95 | 19 | $10 \times 10^{-6}$ |
| Fe—3Si plate | 1.90 | 90 | 18 | $3 \times 10^{-6}$ |
| Fe—12Si—10B plate | 1.70 | 7 | 2 | $27 \times 10^{-6}$ |
| Fe—1Cu—3Nb—13Si—9B plate | 1.23 | 1 | 1 | $10 \times 10^{-6}$ |

As shown in Table 1, it is confirmed that an Fe—Co-based plate has higher Bs and smaller Hc and Pi than an Fe plate. It is confirmed that an Fe—N-based plate and an Fe—Co—N-based plate have high Bs and large Hc and Pi as compared with an Fe plate. It is confirmed that an Fe-3Si plate, an Fe-12Si-10B plate, and an Fe-1Cu-3Nb-13Si-9B plate have small Hc and Pi and small Bs as compared with an Fe plate.

Experiment 3

(Preparation of Laminated Iron Core)

A laminated iron core was prepared using the various soft magnetic iron plates prepared in Experiment 1. In preparing a laminated iron core, a soft magnetic iron plate having a smaller magnetostriction constant was laminated as an outermost layer, epoxy resin (electrical resistivity=$1\times10^7$ $\Omega \cdot$cm, average thickness=5 µm) was used as an electrically insulating adhesive layer between soft magnetic iron plates, and compressive stress of 5 to 10 MPa was applied in a lamination direction until the adhesive layer was cured. After lamination and adhesion of the soft magnetic iron plates, the soft magnetic iron plates were held at 150° C. for 24 hours to remove distortion at the time of pressure adhesion. A space factor of the soft magnetic iron plate in the laminated iron core is about 95 vol %. Specifications of the manufactured laminated iron core are shown in Table 2 described later.

Experiment 4

(Investigation of Magnetic Characteristic of Laminated Iron Core)

Magnetic characteristics (Bs, Hc, $Pi_{-1.0/400}$) of various laminated iron cores prepared in Experiment 3 were investigated in the same manner as in Experiment 2.

As described above, one of purposes of the laminated iron core of the present invention is to exhibit Bs superior to that of an electromagnetic pure iron plate, and increase of 0.03 T or more is required for clear characteristic improvement in Bs and a significant difference. Therefore, with respect to Bs, a case of 2.17 T or more was determined as "excellent", and a case of less than 2.17 T was determined as "poor". Further, regarding $Pi_{-1.0/400}$, less than 40 W/kg was set as a design allowable range in a case where Bs is 2.17 T or more. That is, a case where $Pi_{-1.0/400}$ was less than 40 W/kg was determined as "excellent", and a case where $Pi_{-1.0/400}$ was 40 W/kg or more was determined as "poor". An investigation result of a magnetic characteristic of the laminated iron core is also shown in Table 2.

As shown in Table 2, Samples 1 to 7 have Bs of 2.17 T or more and $Pi_{-1.0/400}$ of less than 40 W/kg, which are both determined as "excellent". Regarding material cost, a second soft magnetic iron plate of Samples 2 to 6 is equivalent to permendur, but a first soft magnetic iron plate of Samples 1 to 7, a second soft magnetic iron plate of Sample 1, and a second soft magnetic iron plate of Sample 7 have low Co content and are cheaper than permendur. As a result, it can be said that cost of the entire laminated iron core is lower than that of permendur. That is, it can be said that Samples 1 to 7 achieve all the objects of the present invention.

On the other hand, in Samples 8 and 9, Bs and $Pi_{-1.0/400}$ do not satisfy a required level, and in Sample 10, $Pi_{-1.0/400}$ does not satisfy a required level. That is, Samples 8 to 10 are determined to be "poor".

The result in Table 2 will be examined. For example, from comparison between Sample 7 and Sample 8, Bs of a second soft magnetic iron plate is preferably 0.8 or more, more preferably 2.0 T or more of Bs of a first soft magnetic iron plate. From comparison of Samples 4 to 6, it can be said that a thickness of a first soft magnetic iron plate is preferably one time or more and five times or less a thickness of a second soft magnetic iron plate.

Experiment 5

(Preparation of Variation of Laminated Iron Core and Investigation of Magnetic Characteristic)

The Fe-20Co-5N plate (thickness=0.1 mm), the Fe-50Co plate (thickness=0.1 mm), and the Fe plate (thickness=0.1 mm) prepared in Experiment 1 were used as a first soft magnetic iron plate, a second soft magnetic iron plate, and a third soft magnetic iron plate, respectively, and the laminated iron core illustrated in FIG. 2 was manufactured in the same manner as in Experiment 3.

A magnetic characteristic of the obtained laminated iron core was investigated in the same manner as in Experiment 2. As a result, magnetic characteristics of Bs=2.30 T, Hc=55 A/m, and $Pi_{-1.0/400}$=17 W/kg were obtained, and it was confirmed that all the objects of the present invention, together with reduction in material cost, were achieved.

The above-described embodiment and experiment are described in order to help understanding of the present invention, and the present invention is not limited only to the specific configurations described. For example, a part of a configuration of the embodiment can be replaced with a configuration of a technical common sense of those skilled in the art, and a configuration of a technical common sense

TABLE 2

Specifications of laminated iron core and investigation result of magnetic characteristic

| Sample No. | First soft magnetic iron plate | | Second soft magnetic iron plate | | Bs (T) | Hc (A/m) | $Pi_{-1.0/400}$ (W/kg) |
|---|---|---|---|---|---|---|---|
| | Composition | Thickness (mm) | Composition | Thickness (mm) | | | |
| 1 | Fe—5N | 0.1 | Fe—20Co | 0.1 | 2.20 | 90 | 21 |
| 2 | Fe—5Co—5N | 0.1 | Fe—50Co | 0.1 | 2.21 | 55 | 11 |
| 3 | Fe—10Co—5N | 0.1 | Fe—50Co | 0.1 | 2.28 | 60 | 15 |
| 4 | Fe—20Co—5N | 0.1 | Fe—50Co | 0.1 | 2.35 | 70 | 17 |
| 5 | Fe—20Co—5N | 0.1 | Fe—50Co | 0.05 | 2.37 | 80 | 20 |
| 6 | Fe—20Co—5N | 0.1 | Fe—50Co | 0.025 | 2.39 | 140 | 35 |
| 7 | Fe—20Co—5N | 0.1 | Fe | 0.1 | 2.18 | 130 | 31 |
| 8 | Fe—20Co—5N | 0.1 | Fe—3Si | 0.1 | 2.14 | 170 | 40 |
| 9 | Fe—20Co—5N | 0.1 | Fe—12Si—10B | 0.025 | 2.13 | 190 | 42 |
| 10 | Fe—20Co—5N | 0.1 | Fe—1Cu—3Nb—13Si—9B | 0.02 | 2.22 | 200 | 44 | of those skilled in the art can be added to a configuration of the embodiment. That is, in the present invention, a part of a configuration of the embodiment and experiment of the present specification can be deleted, replaced with another configuration, or added with another configuration without departing from the technical idea of the invention.

REFERENCE SIGNS LIST 10, 20 laminated iron core
1 first soft magnetic iron plate
2 second soft magnetic iron plate
3 third soft magnetic iron plate
4 electrically insulating layer
21 stator slot
22 slit
23 tooth
24 tooth claw portion
30 stator
31 stator coil
32 segment conductor
33 electrically insulating material

The invention claimed is:

1. A laminated iron core in which a plurality of types of soft magnetic iron plates are laminated, wherein
    the plurality of types of soft magnetic iron plates include
        a first soft magnetic iron plate and a second soft magnetic iron plate,
    the first soft magnetic iron plate and the second soft magnetic iron plate are alternately laminated,
    the first soft magnetic iron plate has higher nitrogen content and higher saturation magnetic flux density than the second soft magnetic iron plate, and
    the second soft magnetic iron plate has lower coercive force than the first soft magnetic iron plate.

2. The laminated iron core according to claim 1, wherein the first soft magnetic iron plate is an iron-cobalt-nitrogen-based iron plate having a chemical composition containing 1 atom % or more and 25 atom % or less of cobalt, 2 atom % or more and 10 atom % or less of nitrogen, and 0 atom % or more and 1 atom % or less of vanadium, with the balance containing iron and an impurity.

3. The laminated iron core according to claim 1, wherein a ratio of saturation magnetic flux density of the second soft magnetic iron plate to saturation magnetic flux density of the first soft magnetic iron plate is 0.8 or more and less than 1.

4. The laminated iron core according to claim 1, wherein the second soft magnetic iron plate has saturation magnetic flux density of 2.0 T or more.

5. The laminated iron core according to claim 1, wherein
    each of the first soft magnetic iron plate and the second soft magnetic iron plate has a thickness of 0.01 mm or more and 1 mm or less, and
    a thickness of the first soft magnetic iron plate is one time or more and five times or less a thickness of the second soft magnetic iron plate.

6. The laminated iron core according to claim 1, wherein the soft magnetic iron plate as an outermost layer has a magnetostriction constant equal to or less than a magneto-striction constant of another one of the soft magnetic iron plates.

7. The laminated iron core according to claim 6, wherein the soft magnetic iron plate as the outermost layer is a third soft magnetic iron plate different from the first soft magnetic iron plate and the second soft magnetic iron plate.

8. The laminated iron core according to claim 1, wherein an electrically insulating layer having electrical resistivity of $1 \times 10^6$ Ω·cm or more is interposed between adjacent ones of the soft magnetic iron plates.

9. A rotating electric machine comprising a laminated iron core, wherein the laminated iron core is the laminated iron core according to claim 1.

10. The laminated iron core according to claim 2, wherein a ratio of saturation magnetic flux density of the second soft magnetic iron plate to saturation magnetic flux density of the first soft magnetic iron plate is 0.8 or more and less than 1.

11. The laminated iron core according to claim 2, wherein the second soft magnetic iron plate has saturation magnetic flux density of 2.0 T or more.

12. The laminated iron core according to claim 3, wherein the second soft magnetic iron plate has saturation magnetic flux density of 2.0 T or more.

13. The laminated iron core according to claim 10, wherein the second soft magnetic iron plate has saturation magnetic flux density of 2.0 T or more.

14. The laminated iron core according to claim 2, wherein
    each of the first soft magnetic iron plate and the second soft magnetic iron plate has a thickness of 0.01 mm or more and 1 mm or less, and
    a thickness of the first soft magnetic iron plate is one time or more and five times or less a thickness of the second soft magnetic iron plate.

15. The laminated iron core according to claim 3, wherein
    each of the first soft magnetic iron plate and the second soft magnetic iron plate has a thickness of 0.01 mm or more and 1 mm or less, and
    a thickness of the first soft magnetic iron plate is one time or more and five times or less a thickness of the second soft magnetic iron plate.

16. The laminated iron core according to claim 4, wherein
    each of the first soft magnetic iron plate and the second soft magnetic iron plate has a thickness of 0.01 mm or more and 1 mm or less, and
    a thickness of the first soft magnetic iron plate is one time or more and five times or less a thickness of the second soft magnetic iron plate.

17. The laminated iron core according to claim 10, wherein
    each of the first soft magnetic iron plate and the second soft magnetic iron plate has a thickness of 0.01 mm or more and 1 mm or less, and
    a thickness of the first soft magnetic iron plate is one time or more and five times or less a thickness of the second soft magnetic iron plate.

18. The laminated iron core according to claim 11, wherein
    each of the first soft magnetic iron plate and the second soft magnetic iron plate has a thickness of 0.01 mm or more and 1 mm or less, and
    a thickness of the first soft magnetic iron plate is one time or more and five times or less a thickness of the second soft magnetic iron plate.

19. The laminated iron core according to claim 12, wherein
    each of the first soft magnetic iron plate and the second soft magnetic iron plate has a thickness of 0.01 mm or more and 1 mm or less, and
    a thickness of the first soft magnetic iron plate is one time or more and five times or less a thickness of the second soft magnetic iron plate.

20. The laminated iron core according to claim 13, wherein each of the first soft magnetic iron plate and the second soft magnetic iron plate has a thickness of 0.01 mm or more and 1 mm or less, and a thickness of the first soft magnetic iron plate is one time or more and five times or less a thickness of the second soft magnetic iron plate.

\*　\*　\*　\*　\*